US012233456B1

(12) United States Patent
Ellingsen et al.

(10) Patent No.: US 12,233,456 B1
(45) Date of Patent: Feb. 25, 2025

(54) METHOD FOR COLD SPRAY ADDITIVE MANUFACTURING

(71) Applicants: Marius D. Ellingsen, Rapid City, SD (US); Aaron Nardi, East Granby, CT (US); Isaac Nault, Bel Air, MD (US)

(72) Inventors: Marius D. Ellingsen, Rapid City, SD (US); Aaron Nardi, East Granby, CT (US); Isaac Nault, Bel Air, MD (US)

( * ) Notice: Subject to any disclaimer, the term of this patent is extended or adjusted under 35 U.S.C. 154(b) by 323 days.

(21) Appl. No.: 17/837,120

(22) Filed: Jun. 10, 2022

Related U.S. Application Data

(60) Provisional application No. 63/211,586, filed on Jun. 17, 2021.

(51) Int. Cl.

| | |
|---|---|
| *B22F 10/38* | (2021.01) |
| *B22F 10/25* | (2021.01) |
| *B22F 12/00* | (2021.01) |
| *B22F 12/53* | (2021.01) |
| *B33Y 10/00* | (2015.01) |
| *B33Y 50/00* | (2015.01) |
| *C23C 24/04* | (2006.01) |

(52) U.S. Cl.
CPC .............. *B22F 10/38* (2021.01); *B22F 10/25* (2021.01); *B22F 12/224* (2021.01); *B22F 12/53* (2021.01); *B33Y 10/00* (2014.12); *B33Y 50/00* (2014.12); *C23C 24/04* (2013.01); *B22F 2203/00* (2013.01)

(58) Field of Classification Search
None
See application file for complete search history.

(56) References Cited

U.S. PATENT DOCUMENTS

| | | | |
|---|---|---|---|
| 6,256,597 B1* | 7/2001 | Wang .................... | B25J 9/1661 703/22 |
| 2012/0269958 A1* | 10/2012 | Subramanian .......... | C23C 24/04 427/457 |
| 2017/0173611 A1* | 6/2017 | Tan ........................ | B05B 7/1486 |

(Continued)

OTHER PUBLICATIONS

Vanerio et al. '3D modelling of the deposit profile in cold spray additive manufacturing' Journal of Manufacturing Processes 67 ( 2021) 521-534, published May 18, 2021.*

(Continued)

*Primary Examiner* — Bernard G Lindsay
(74) *Attorney, Agent, or Firm* — Jeffrey A. Proehl; Woods, Fuller, Shultz & Smith, PC

(57) ABSTRACT

A method of additive manufacturing using cold spray deposition of particles of a material to a supporting surface for deposited material. The method may include providing a cold spray deposition apparatus having a nozzle with a central axis forming an impact angle with the supporting surface and providing an additive material for application to the supporting surface using a cold spray deposition technique. The method may include analyzing characteristics of deposited cold spray material which may include forming a single line of deposited cold spray material on the supporting surface and generating a model of the deposited cold spray material. The method may include selecting a proposed path of movement of the nozzle, predicting results of using the proposed path using the generated model, and modifying the proposed path of movement of the nozzle to reduce error resulting from the proposed path.

19 Claims, 12 Drawing Sheets

(56) References Cited

U.S. PATENT DOCUMENTS

2018/0050391 A1* 2/2018 Maev ..................... C23C 24/04
2022/0314322 A1* 10/2022 Killian ................. B23K 20/122

OTHER PUBLICATIONS

Wang et al. 'Characterization and modeling of the bonding process in cold spray additive manufacturing' Additive Manufacturing 8 (2015) 149-162, published 2015.*

Nault et al. 'Multi-axis tool path optimization and deposition modeling for cold spray additive manufacturing' Additive Manufacturing 38 (2021) 101779, published Dec. 17, 2020.*

* cited by examiner

METHOD FOR COLD SPRAY ADDITIVE MANUFACTURING

REFERENCE TO RELATED APPLICATIONS

This application claims the priority benefit of U.S. Provisional Patent Application No. 63/211,586, filed Jun. 17, 2021, which is hereby incorporated by reference in its entirety.

BACKGROUND

Field

The present disclosure relates to additive manufacturing techniques and more particularly pertains to a new apparatus and method for cold spray additive manufacturing for mitigating geometric defects and material defects in the resulting part.

Description of the Prior Art

Cold spray material deposition is a process in which powdered materials are accelerated through a nozzle using a non-combustible gas to accelerate the particles to velocities sufficient to cause plastic deformation and bonding between the accelerated particles and an application surface impacted by the particles. Nozzles used in the process are typically the converging-diverging De Laval style nozzles but can be designed to match the material and velocities required. The gases used for the deposition process are generally helium, nitrogen, air, or a combination thereof, but can be any compressible gas. Pressures used for the deposition process are generally high and in the range of approximately 200 psi to approximately 1000 psi, but depending on the specific powder material, size, and nozzle design employed, the pressures utilized can be lower or higher. The gases employed for the deposition process may also be heated in order to change the gas dynamics effects through the nozzle, but also to increase the temperature of the powder particles on impact.

The nature of the cold spray material deposition process involves the deposition of materials in the solid state to achieve high bond strength to a substrate, and high interparticle strength may be achieved through a process of plastic deformation of the particle and a substrate or a previously deposited layer of the particles. Because the deposition process simply utilizes high pressure gas flowing through a nozzle and typically employs some heating source for the gas, cold spray material deposition is nearly infinitely scalable to higher or lower deposition rates. Demonstrations have shown that materials can be deposited up to approximately 30 pounds per hour with currently available systems and are routinely deposited at nearly 10 pounds per hour in many applications. Demonstrations have also shown that cold spray can be scaled down to deposition through a hypodermic needle depositing traces or copper and aluminum for electronics applications.

Additive manufacturing is generally a process in which material is added to an existing part or to a sacrificial substrate to build an entire part, a feature on an existing part, or simply add material back to a surface to restore the original part geometry. Some additive manufacturing processes are designed in such a way to target one of these types of applications, however cold spray material deposition has been demonstrated to be advantageous in each of these types due to the benefits of low heat input to the substrate combined with desirable bonding and mechanical properties in the resulting part. Another important aspect of additive manufacturing is the relationship between the "spot size" of the deposited material (e.g., the size of the deposited line that can be created in one pass across the surface of the substrate) and the geometric accuracy of the deposited material of the part in the as-manufactured or finished condition. Smaller spot sizes generally reduce the deposit rate but increase the accuracy of the deposition process to the desired end product. Due to the scalability of the cold spray material deposition process, it is possible to have systems capable of high accuracy in the deposited material to the finished geometry, or lower adherence to the desired geometry, but with higher material deposit rates. In addition, by building certain geometries on complex mandrels, it has been shown that both geometry adherence and high deposition rates are possible.

SUMMARY

The present disclosure relates to apparatus constructed to produce a component using cold spray deposition techniques for additive manufacturing, and methods related to cold spray deposition techniques that enable a component to be produced from a digital representation of that component. These techniques for additive manufacturing can be utilized in the production of an entire component on a simple geometry, the production of an entire component on a complex geometry, or the addition of material in a particular geometry on an existing component.

In some aspects, the disclosure relates to a method of additive manufacturing using cold spray deposition of particles of a material to a supporting surface for deposited material. The method may comprise providing a cold spray deposition apparatus having a nozzle from which particles of the cold sprayed material are sprayed, with the nozzle having a central axis forming an impact angle with the supporting surface. The method may also comprise providing an additive material for application to the supporting surface using a cold spray deposition technique. The method may further comprise analyzing characteristics of deposited cold spray material, which may include forming a single line of deposited cold spray material on the supporting surface and generating a model of a geometric profile characteristic and a material defect characteristic of the single line of deposited cold spray material as a function of the impact angle of cold spray material sprayed from the cold spray deposition apparatus. The method may comprise selecting a proposed path of movement of the nozzle of the spray apparatus with respect to supporting surface, and predicting, using the generated model, a bulk deposit geometry and a material defect distribution resulting from the proposed path of movement of the nozzle. The method may also comprise modifying the proposed path of movement of the nozzle to reduce error between the predicted bulk deposit geometry and a desired contour of the exterior of the component.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1A:
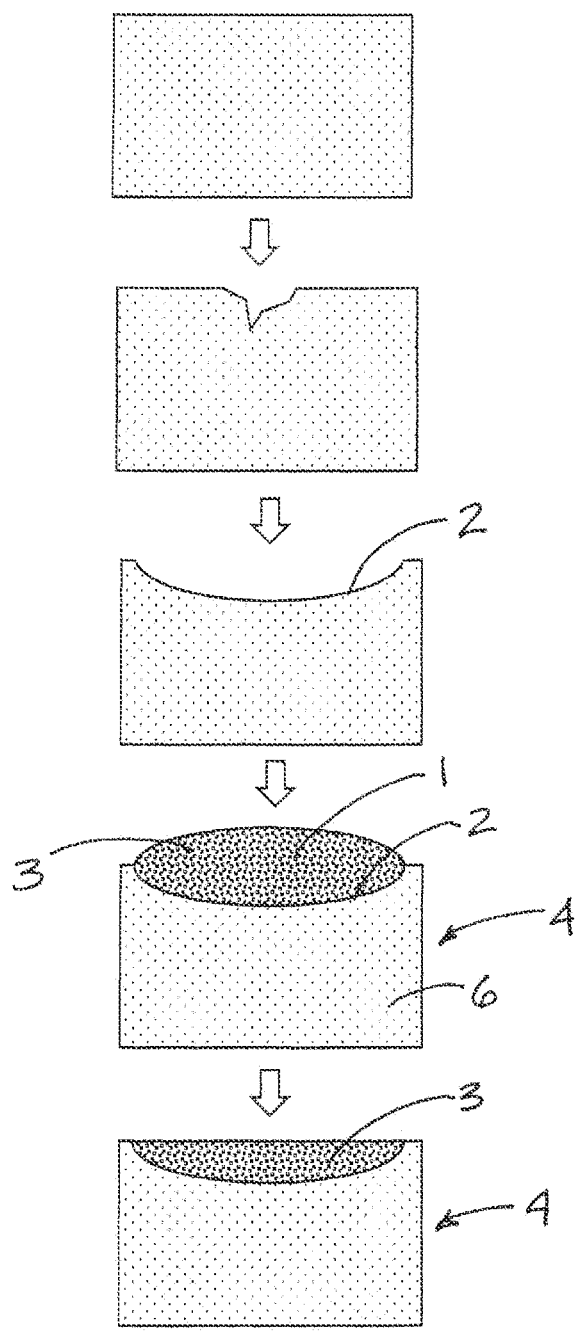
FIGS. 1A through 1D are schematic diagrams representing scenarios in which cold spray material deposition may be utilized for additive manufacturing.
Figure 1B:
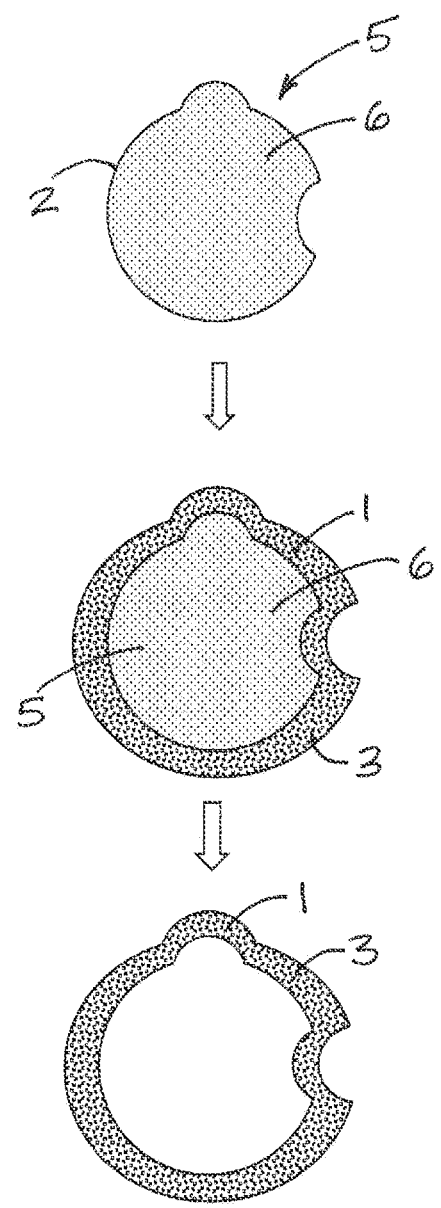
Figure 1C:
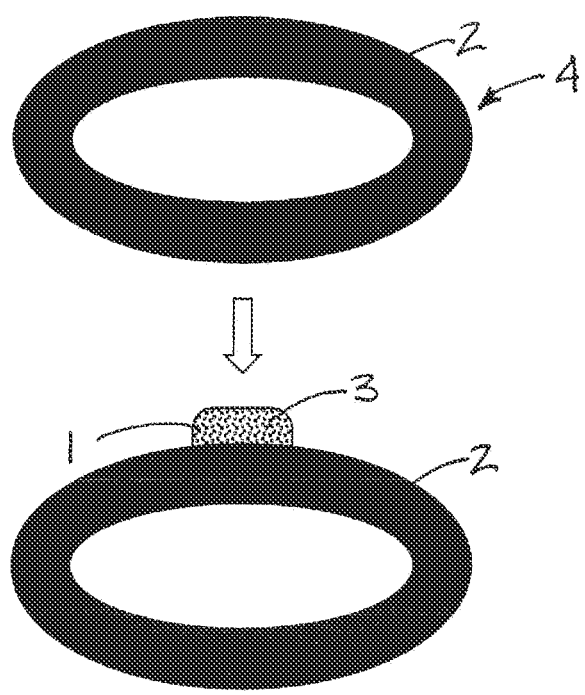
Figure 1D:
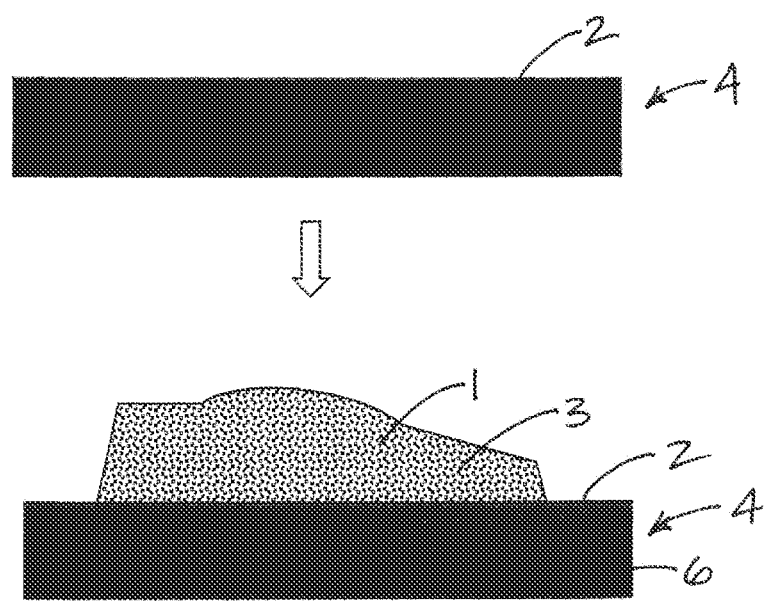
Figure 2A:
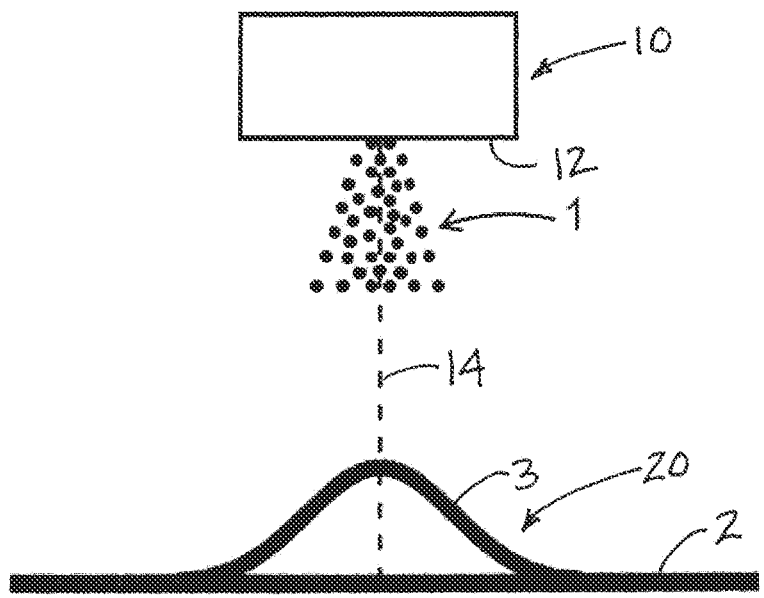
FIGS. 2A and 2B are schematic diagrams illustrating various impact angles for cold spray material deposition on a surface.
Figure 2B:
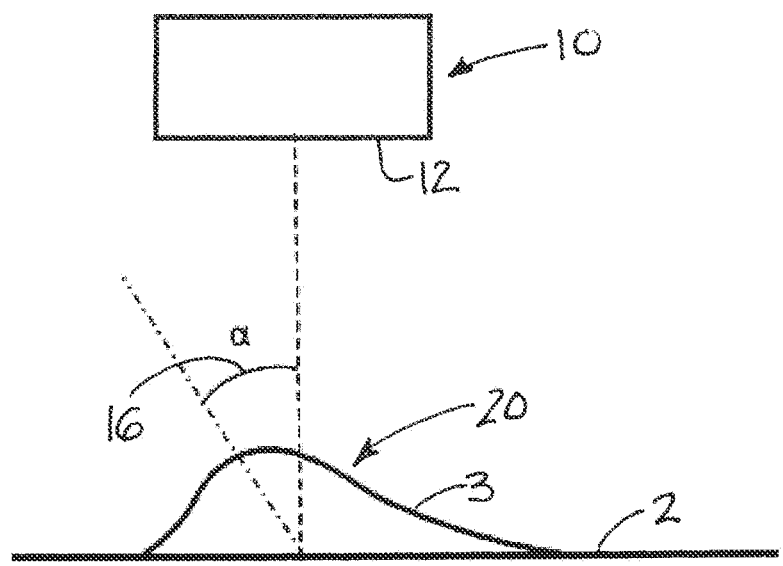

With reference now to the drawings, and in particular to FIGS. 1 through 6 thereof, a new apparatus and method for cold spray additive manufacturing embodying the principles and concepts of the disclosed subject matter will be described.

The applicants have recognized multiple scenarios in which cold spray material deposition techniques may be useful for additive manufacturing. These multiple scenarios may comprise at least four scenarios which may include (1) the repair of parts by restoring to original dimension areas in which damage such as cracking or corrosion has been removed by a machining process (see, e.g., FIG. 1A); (2) the manufacture of parts by depositing material to a prescribed thickness on a complex mandrel 5 bearing the inner shape of the part (see, e.g., FIG. 1B); (3) the manufacture of parts as a step in a broader hybrid manufacturing process in which cold spray material application is used to add a feature to an existing (and potentially complex-shaped) body (see, e.g., FIG. 1C); and (4) the manufacture of parts by free-form layer-by-layer fabrication, in techniques similar to "3D printing," starting from a flat or lightly-curved mandrel 5 (see, e.g., FIG. 1D).

A basic cold spray apparatus 10 suitable for performing cold spray material deposition may include a nozzle 12 having an exit opening through which particles 1 move at a high velocity out of the apparatus and toward the application surface on which the particles are to be deposited, such as the surface of a substrate 6 or the surface formed by a layer of previously deposited particles 3. The nozzle 12 may have a central axis 14 along which particles move as the particles exit the exit opening of the nozzle. A cold spray plume is a cloud of the high-velocity powder particles that forms outside the exit opening of the nozzle of the cold spray deposition apparatus. The plume of particles 1 originates at the exit opening of the nozzle and terminates at the application surface where the particles impact and bond to the application surface. Most particles of the plume tend to stay within a relatively well-defined envelope that generally bears the shape of the exit opening of the nozzle at the original portion of the plume and the plume gradually expands outward toward the terminal portion of the plume. The spray plume has a width which may be defined as the diameter of the plume envelope. The plume width is typically a function of the distance from the nozzle exit opening, but in practical terms can be assumed to be substantially equal to the diameter of the nozzle exit opening because the plume expansion is very gradual.

Particles 1 moving in the cold spray plume may have an angle 16 of impact (or "impact angle") with respect to the application surface, and the angle of impact may be defined as the angle between the trajectory of the particle and an axis normal or perpendicular to the application surface 2 supporting the deposited material 3. Typically, most of the particle motion in the plume is oriented parallel to the central axis 14 of the nozzle, with only a relatively small portion of the total particle motion being in a radial direction, and thus the angle 16 of impact can be accurately approximated by the angle between the orientation of the central axis of the nozzle and the axis normal to the application surface 2. Thus, an impact angle 16 of 0 degrees refers to a configuration in which the central axis 14 of the nozzle is oriented perfectly normal to the application surface (see, e.g., FIG. 2A). As a further illustration, a high angle impact may refer to a configuration in which the central axis 14 of the nozzle forms an oblique angle 16 with the surface (see, e.g., FIG. 2B).

The applicants have recognized that, while defects in cold spray material depositions can be caused by a variety of factors including process parameters, poor powder handling, etc, a significant factor in causing defects may also be caused by a path of movement by the tool of the apparatus, specifically the nozzle, which may result in particles 1 impacting the application surface at a higher than optimal angle 16 of impact. Typically, the optimal impact angle 16 for particles in a cold spray material deposition process is approximately 0 degrees, or as close as possible to 0 degrees.

The applicants recognize that impact angles 16 that depart from approximately 0 degrees may have a significant effect, both advantageous and detrimental, on the bulk material properties of the part or portion of the part formed using cold spray material deposition. For example, a "bond coat" of the particles 1 comprised of some powder materials may be produced using impact angles deviating from 0 degrees may function to increase the adhesion between the deposition particles 3 and the substrate 6. For other powder materials, cold spray material deposition utilizing impact angles deviating from 0 degrees for the particles may result in increased levels of porosity of the deposited material and may further result in reduced adhesion between particles of the deposited material.

In most cases, the qualities or characteristics of the material 3 deposited via cold spray material deposition can be highly dependent on the impact angle 16 employed, and the relationship between impact angle and a particular characteristic of the deposited material 3 is not uniformly linear. For example, the particles 1 of a deposition material may exhibit better adhesion at a moderate impact angle measurement but inferior adhesion at a higher impact angle measurement.

As a result, when cold spray material deposition is attempted on a complex surface, some variations in the path of movement of the nozzle 12 can result in unintentional and undesirable effects on the quality and integrity of the deposited material. The applicants have thus recognized that planning the path of the nozzle to control the impact angle or angles that occur during the deposition process can be an important aspect of the deposition process. When planning the tool path, it may be important to predict the impact angles that will result from a given tool path and understand how the impact angle will affect material quality and deposit shape.

One aspect of the disclosure relates to a method or methods directed to preparation for cold spray application of additive material 20 to an application surface 2 to mitigate or minimize defects in the part that is fabricated or repaired such as, for example, geometric defects and material defects. In general, the method may include generating a model of a geometric profile and material defects resulting from a single line of cold spray material deposition as a function of impact angle 16; predicting the bulk deposit geometry and the material defect distribution resulting from a given tool path for movement of the cold spray nozzle; and modifying the tool path for the cold spray nozzle to reduce the error between the predicted deposit geometry and the desired object shape and reduce the overall probability of material defects (see, e.g., FIG. 3A).

Figure 3A:
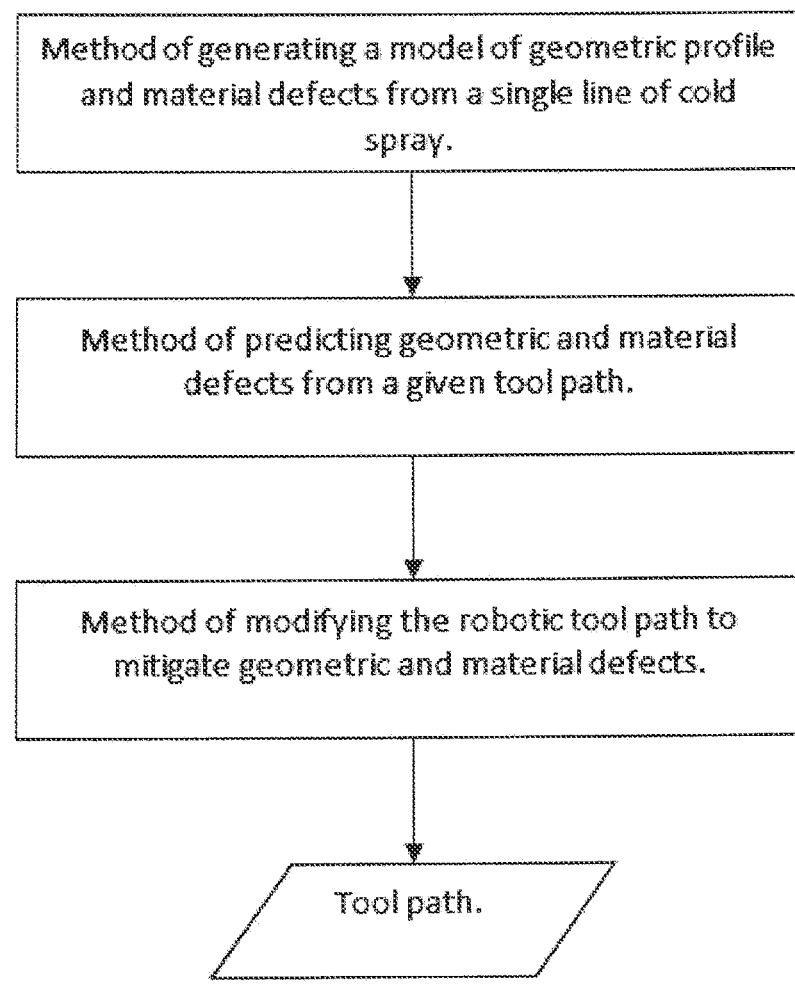
FIGS. 3A through 3C are schematic flow diagrams of aspects of methods relating to a cold spray material deposition techniques useful for additive manufacturing.
Figure 3B:
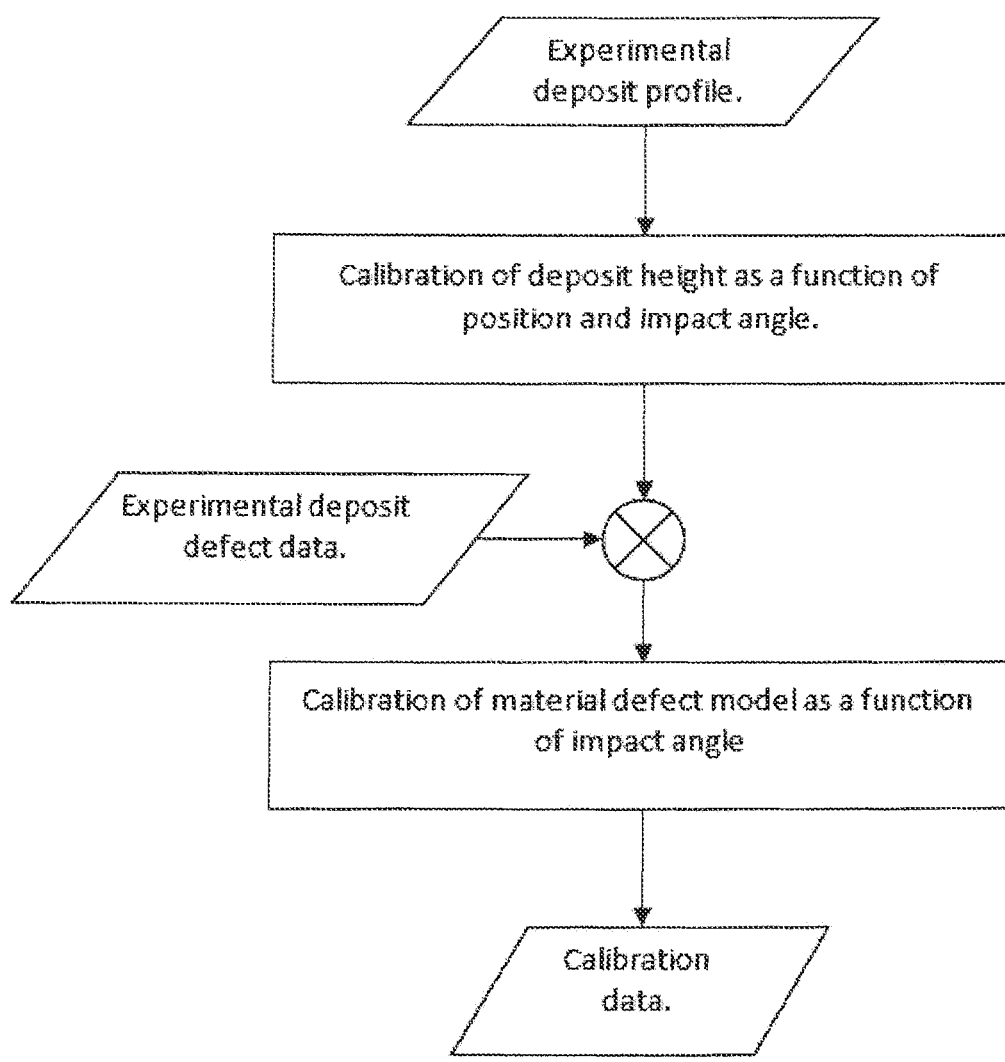
Figure 3C:
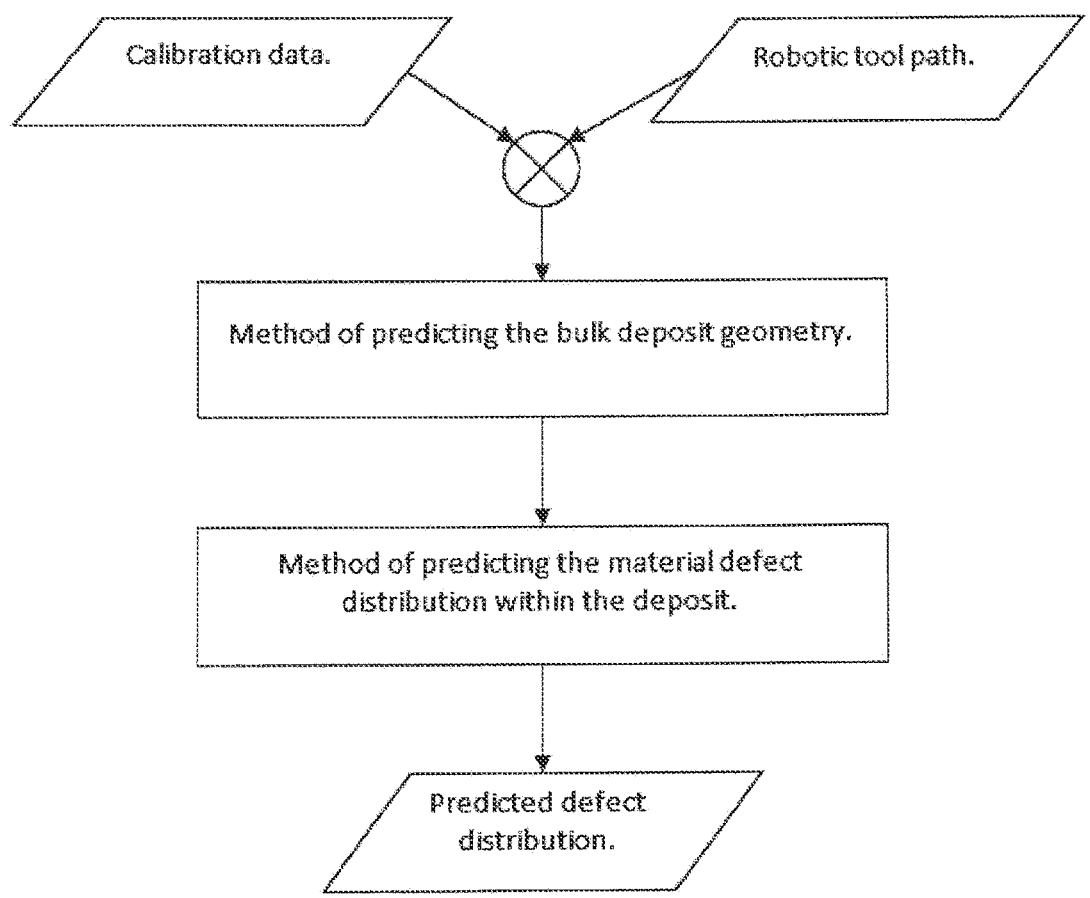
Figure 4A:
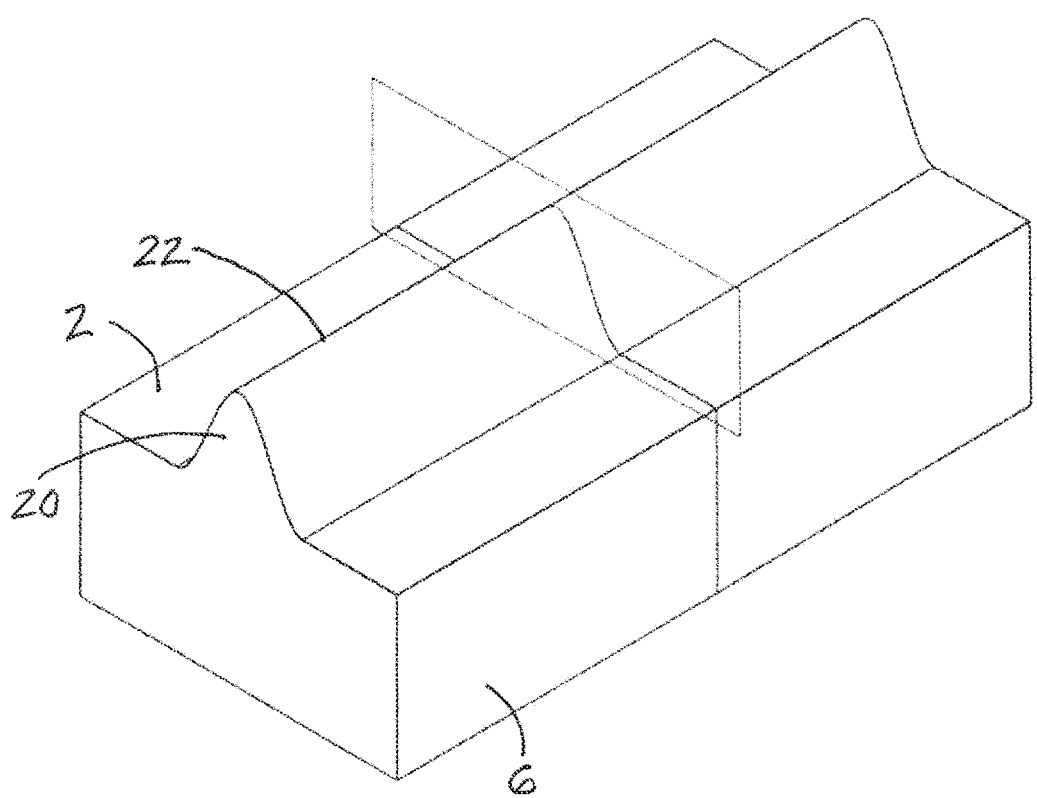
FIGS. 4A and 4B are schematic diagrams relating to visualizations useful for illustrating material defect distribution within cold spray deposited material.
Figure 4B:
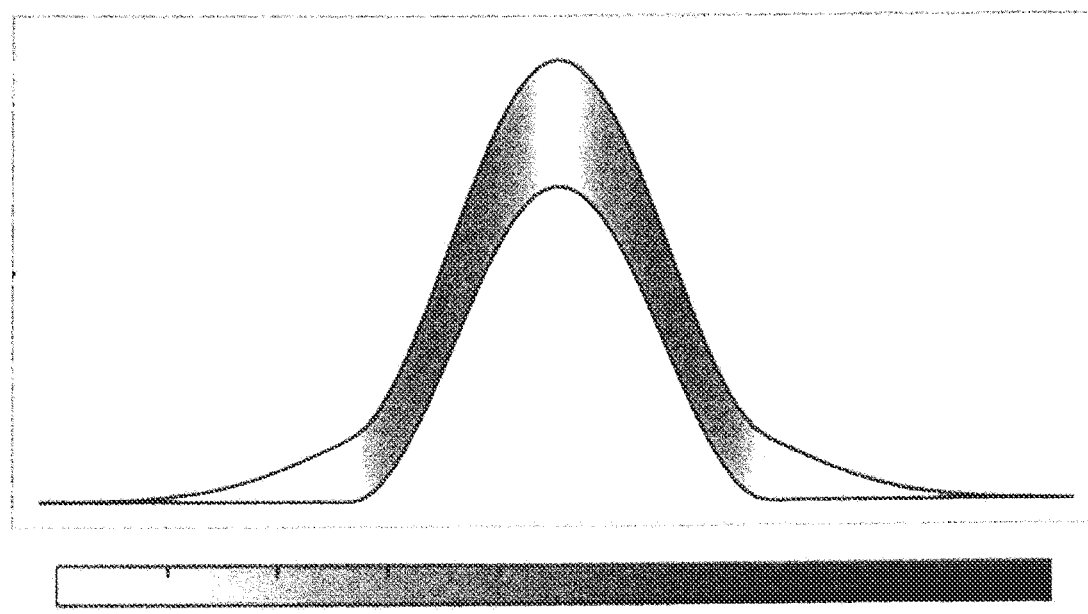

Initial aspects of the method may include the generation of a model of the relationship between the impact angle utilized in the cold spray deposition process and the resulting geometric profile and material defects in the deposited material (see, e.g., FIG. 3B). In implementations of the disclosure, a "single line" of cold spray deposited material may be utilized to analyze and determine the relationship between impact angle of the spray application and the geometric profile and material defects of the deposited material 3. A model of the properties of a single line 22 of cold spray deposited material may be developed to facilitate predictions regarding the geometric profile and material defects which may occur in a bulk deposit. Models based upon more than a single line of cold spray deposited material may also be utilized. A "single line" of cold spray deposited material 3 is the material deposited on a substantially flat or planar surface as a result of a single pass of the cold spray nozzle directing particles at the surface and moving at a constant speed with respect to the surface, in a linear direction of movement with respect to the surface, and being oriented such that the impact angle of particles emanating from the nozzle remains uniform with respect to the surface along the line.

The geometric profile of the line 22 is the shape of a cross-section of the single-line deposit taken in a plane that is normal or perpendicular to the direction of movement of the nozzle and that is normal or perpendicular to the surface. One relationship is the height of the single-line deposit as a function of position with respect to the center of the cold spray plume and the height of the single-line deposit as a function of impact angle. Another relationship is the occurrence of defects in the deposited material 3 as a function of the impact angle utilized to form the single-line of deposited material. The shape of the geometric profile of the single-line deposition may be determined by one of at least three approaches, and each one of these approaches has inherent strengths and weaknesses.

One approach assumes that the profile of the deposited material is equivalent to a Gaussian shape with a standard deviation equal to one quarter of the diameter of the exit opening of the nozzle. This approach assumes that 95% of the sprayed material impacts the surface within a lateral distance equal to the diameter of the nozzle exit opening. An advantage of this approach is that subsequent computations may be made much more efficiently. The weakness of this approach is that the Gaussian shape may not accurately capture the true shape of the profile of the deposited material.

Another approach involves the process of spraying material in more than one pass along the same line and over the same position, sectioning or cutting the deposited material in a lateral plane, making a metallographic sample of the section of the deposited material, and measuring the height of the profile of the deposited material. Advantageously, this approach is more likely to provide a more accurate representation of the geometric profile. One potential disadvantage of this approach is that, for the number of passes required to achieve a statistically meaningful cross-section of the deposited material, only the initial pass is applied to a flat surface and, during subsequent passes, the material being deposited is applied to layers of earlier deposited material and the contour of the underlying shape is changing with each pass so that, by the final pass, the shape of the profile is not a true representation of deposition on a flat surface.

A third approach utilizes a laser particle velocimetry instrument to capture a histogram distribution representation of the location of particles within the cold spray particle plume and an assumption is made that the distribution of particles in the plume is equivalent to the shape of the profile of the deposited material. One benefit of this approach is that the result is independent of the traverse speed of the nozzle or number of passes made which may distort the ultimate shape of the profile. One weakness of this approach is that the laser particle velocimetry instrument may not capture particles in different locations of the spray plume with equal probability, resulting in an inaccurate probability distribution. Further, the particle velocity and particle size as a function of the position of the particle within the plume may also vary, and as a result the profile shape of the deposited material may not be directly proportional to the particle-position distribution in the plume.

After the shape of the profile is determined or approximated, it must be normalized such that the total volume of the shape is equal to one. The height of the geometric profile is directly proportional to the normalized shape by a single multiplicative factor. The multiplicative factor can be determined by a procedure in which a test profile is created. A test profile may be created by cold spraying several lines of material which are sprayed at a constant spacing and constant velocity of traversal, and repeated for several passes. The lateral spacing between the line of each pass and the next adjacent pass should be less than 1/10th of the width of the plume, and the number of lines in each pass should exceed a value of two times the plume width divided by the line spacing. Under such conditions, cold spray deposited material having a profile shape with a plateaued top may be formed. A "thickness-per-pass" figure may be calculated by measuring the magnitude of the height of the deposit in the plateaued area and dividing the magnitude of the height by the number of passes utilized to create the test profile. Preferably, at least about 10 passes should be made to get a statistically meaningful value. The multiplicative factor is equal to the line spacing times the traverse velocity times the thickness-per-pass. The procedure may be repeated several times, and a different impact angle may be used each time, to determine the multiplicative factor as a function of the impact angle utilized. It is believed that the best results may be provided when the nozzle is angled in the direction of traverse so that the cross-section will be symmetric with respect to the center of the deposit.

With regard to developing a model for material defects in the material applied using cold spray deposition, the model may be determined using the same or a similar procedure to the procedure employed to determine the profile height. A cold spray material deposit may be formed using multiple passes with substantially uniform line spacing and substantially uniform velocity of traversal. Preferably, the material deposition may be repeated for multiple impact angles ranging from approximately 0 degrees to as close to approximately 90 degrees as practical.

Each cold spray deposition material deposit formed by the procedure may be measured for any material property of interest to determine the relationship between the material property and the impact angle utilized. The relationship between material defects and impact angle may then be established by some known a priori relationship between measurable material properties and probability of defects. Examples of material properties that may be measured include, for example, porosity, micro-hardness, tensile strength, and tensile elongation. Illustratively, porosity and micro-hardness may be measured by taking a cross-section of the material deposit and making a polished metallographic sample. For example, porosity may be measured by optical analysis of the metallographic sample of the material deposit, and micro-hardness may be measured by making several indents with a micro-indenter and analyzing the indent size. Illustratively, tensile strength and elongation can be measured by cutting one or more tensile bars from the material deposit and pulling on, or applying tension to, the bar of the material deposit. The properties measured by these tests may be understood as functions of the impact angle because the entire material deposit was formed using a substantially uniform impact angle.

In the process of predicting geometric and material defects from a given tool path, a further aspect of the disclosure may include a process of generating an initial tool path. Illustratively, computer-aided-manufacturing (CAM) software may be used to generate an initial approximation of a robotic tool path that covers an arbitrary surface to be sprayed (see, e.g., FIG. 3C). A robotic tool path may be defined as a series of motions that achieve the position and orientation of the cold spray nozzle (and more specifically the exit opening of the nozzle) as a function of time. In some implementations, the tool path may be considered to "cover" a surface if three conditions are met: (1) the tool path conforms to the contours of the surface, (2) the orientation of the central axis of the nozzle is normal to the surface at all points along the path, and (3) the maximum spacing between consecutive curves is no greater than one fourth of the dimension of the plume width. These conditions may be considered to insure that the entire surface will be coated. The tool path may be permitted to extend beyond the surface-to-be-coated to perform sharp turns which would result in large decelerations that would otherwise have strong effects on deposit thickness.

The disclosure may also include a process of predicting the bulk geometry of the deposited material. The outer surface of the deposited material may be modeled by a discrete mesh that is computed incrementally by adding the contributions from each section of the tool path, one step at a time. Each point on the surface mesh for the deposited material may have a location and surface normal, or axis normal to the surface at the location of the point. In each step, the following calculations may be made for every point on the mesh: (1) the impact angle (defined as the angle between the surface normal and the central axis of the nozzle), (2) the position of the point within the spray plume from the nozzle, (3) the height of the deposited material that will be formed at the point using the model disclosed for calibration of deposit height, (4) the new position of the point after material deposition, and (5) the new surface normal of the point after material deposition.

Further, the disclosure may include a process for predicting the distribution of material defects in the deposited material. The material defect distribution is the probability of having a material defect as a function of location within the deposit (see, e.g., FIG. 4A). The defect distribution may be calculated in parallel with the surface mesh computation of the process of predicting the bulk geometry. As the location of each new point is calculated, the probability of a defect being located at that point may be simultaneously calculated as a function of the impact angle using the model disclosed for the calibration of the material defect as a function of the impact angle. At the end of each layer, the defect probability of each point may be computed as a weighted average of all the values in the layer. The defect probability and the location of the point are then stored permanently. By the end of the bulk deposit computation process, a data set collection of the points, with a defect probability assigned to each of the points, may be distributed uniformly within the deposited material. The defect probability at other points in the deposit can be interpolated from the data set. The defect distribution can be visualized by a 2D map showing the probability of a defect in color for any cross-section of the deposit (see FIGS. 4A and 4B).

Figure 5:
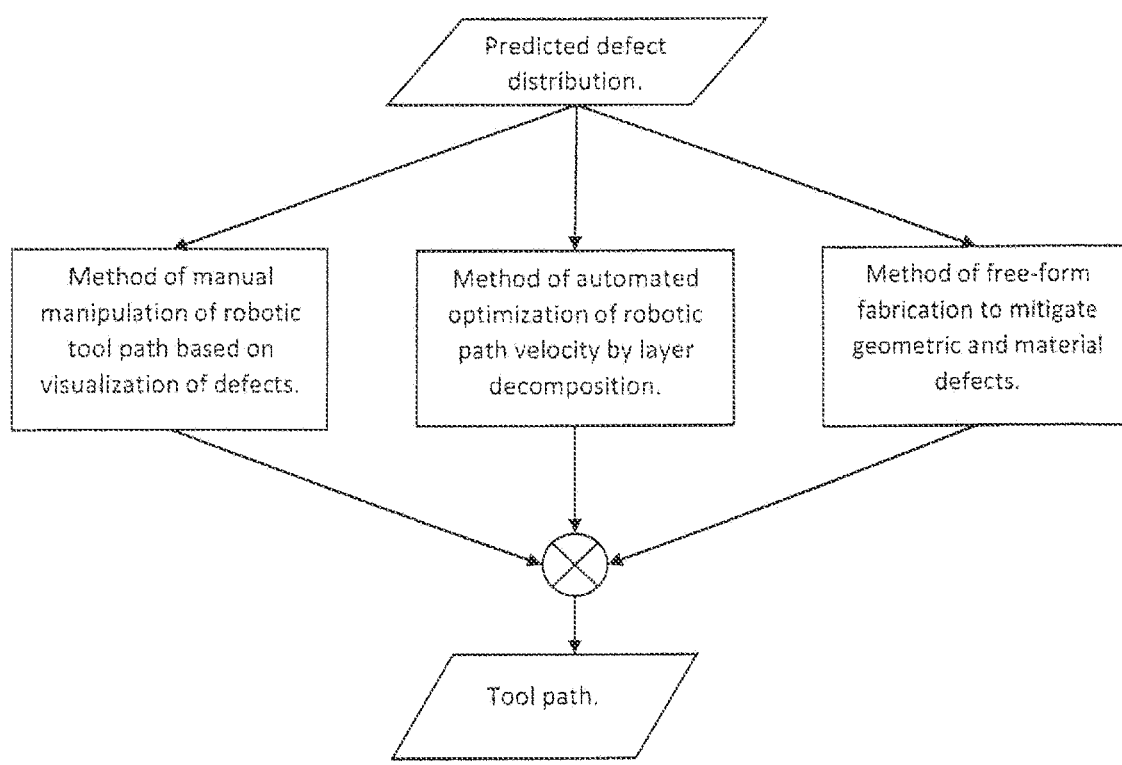
FIG. 5 is a schematic flow diagram of aspects of the methods relating to the utilization of cold spray material deposition techniques for additive manufacturing.
Figure 6:
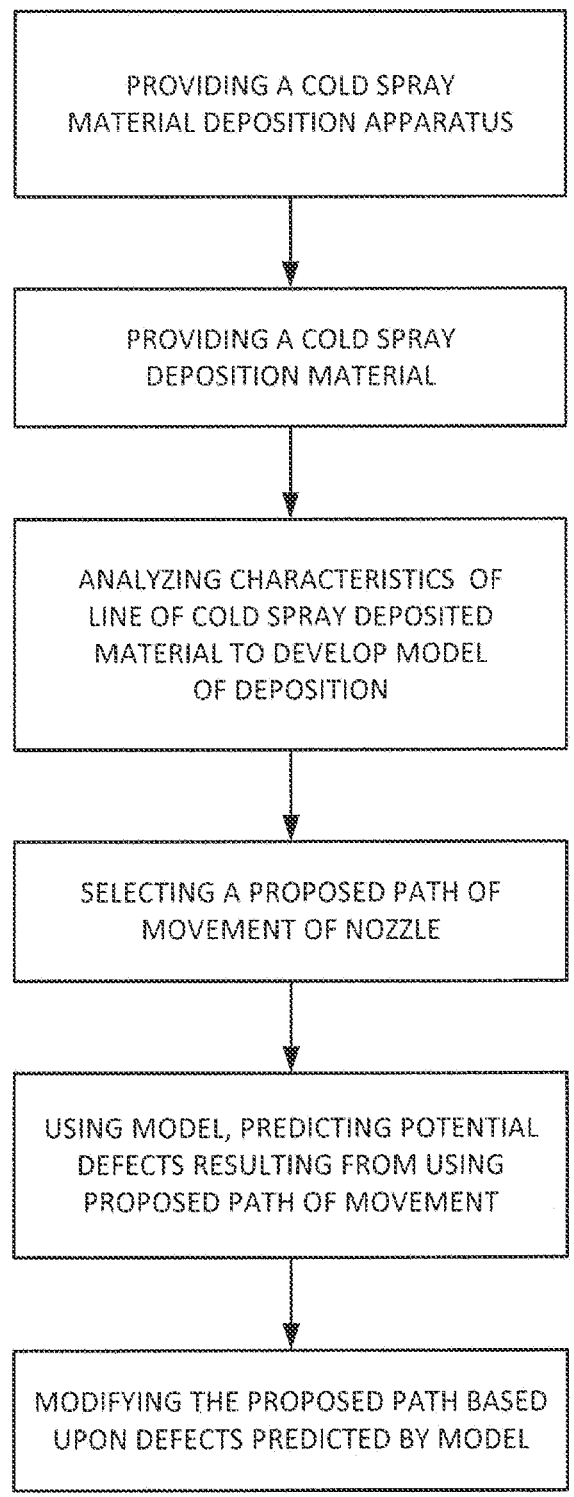
FIG. 6 is a schematic flow diagram depicting aspects of the method of the disclosure.

The disclosure may also include a process for modifying the initial robotic tool path to mitigate geometric and material defects in the deposited material (see, e.g., FIG. 5). The initial robotic tool path may be modified to mitigate geometric and material defects using at least one of three approaches: (1) manual manipulation of the initial robotic tool path based on a visualization of defects; (2) automatic optimization of the tool path velocity on a layer-by-layer basis; and (3) free-form fabrication to minimize geometric errors. Optionally, approaches (1) and (2) may be combined to improve the accuracy of the results. Approach (3) may be highly suitable for free-form layer-by-layer fabrication of a component 4. All three approaches may be used as modules within CAM software to simplify the application. All three approaches may be based on the defect prediction methods disclosed herein.

In the first approach, using manual manipulation of the robotic tool path based on visualization of defects, a user may generate a new tool path within the CAM software, and a rendering of the predicted deposit shape and the defect distribution resulting from the manipulation may be automatically generated and displayed on the screen. The user may be able to slide an adjustable 2D plane to view a 2D image of the defect probability map within the cross-section of the deposited material. Based on these results and the user's subject matter expertise, the user can make manual modifications to the robotic tool path via the CAM software in an attempt to reduce geometric or material defects or to alter the location of the defects to a location of the part that may have less impact on part performance.

In the second approach, using an automated optimization of the robotic path velocity by layer decomposition, the CAM software may "slice" the planned cold spray material deposit into free-form "target" layers of approximately equal thickness. Preferably, the thickness of each target layer is no more than twice the thickness of the cold spray layer thickness that would be formed by a conventional cold spray material application to a flat plate. However, these layers do not have to be flat, and typically are not flat. On each layer, the CAM software may generate a tool path that covers the previous layer surface, and the tool path velocity may be modified such that the predicted deposit surface at the end of the layer matches the contours of the targeted surface as closely as possible. In some implementations, the tool path velocity may be modified by computing a "geometric score" which may quantify how well the predicted layer surface matches the surface of the targeted layer. A "geometric score gradient" may quantify how much the geometric score changes for changes in velocity. A gradient descent optimization algorithm may use the geometric score gradient to minimize the score and determine the optimal tool path velocity on each portion of the tool path. This process may be repeated for each layer. Material defect mitigation can be added to this process by computing a "defect score" which quantifies the level of defects in the layer and a "defect score gradient" which quantifies how much the defect score changes for changes in velocity. A "total score" function, which is a weighted sum of the geometric and defect score, can be minimized by a gradient descent algorithm to achieve an optimal balance of geometric accuracy and low defect probability. This approach may be primarily used for usages such as scenarios (1), (2) and (3) identified in this disclosure, but can also be used for scenarios such as scenario (4).

The third approach, using free-form fabrication to mitigate geometric and material defects, may be highly suitable for applications in which an entirety of the component 4 or part is being fabricated from an initially-flat surface. In this approach, the CAM software may slice the object to be fabricated by cold spray material deposition into planar layers of substantially equal thickness. On each layer, the CAM software may generate a tool path that covers the surface of the previously deposited layer with the additional requirement that the width between each consecutive tool movement trajectory is substantially equal, and preferably exactly equal. A nearly-rectangular deposit profile of cold spray material with a width equal to the width between tool movement trajectories may be laid down along the entire trajectory to completely fill in the layer. The layers are constructed sequentially in this manner until reaching the height of the object being fabricated. By doing so, the geometric shape of the object is achieved, while minimizing geometric error in the process. The nearly-rectangular deposit profile may be achieved by a series of 2 or 3 passes of cold spray deposition made at various impact angles in the plane normal to the direction of traversal of the tool path trajectory at any point in time. In the 2-pass technique, the central axis of the nozzle forms an angle of theta in the first pass and then an angle of negative theta in the 2nd pass. In the 3-pass technique, the central axis of the nozzle forms an angle of zero in the first pass, an angle of theta in the 2nd pass, and an angle of negative theta in the 3rd pass. The method of predicting the material defect distribution may be used to optimize the angle theta so that the predicted level of defects in each rectangular cross-section of deposited material is minimized and the method of automated optimization of the robotic path velocity may be used to predict the width of the rectangle so that the spacing between adjacent tool paths can be properly set in the CAM software. The methods of predicting the bulk deposit geometry and predicting the material defect distribution may also be used to determine which of the 2-pass or 3-pass method produces the better result. It is anticipated that the build profile and thus the characteristic angle theta will vary based on, at a minimum, nozzle geometry, applicator design, material being deposited, deposition conditions (e.g., gas pressure, gas type, and gas temperature), and the distance between the exit opening of the nozzle and the surface upon which the particles impact.

Another aspect of the disclosure relates to the apparatus that may be utilized to perform aspects of the method including fabricating or repairing parts that tends to mitigate geometric and material defects with cold spray additive manufacturing. The aspects of the method of the disclosure are believed to be most effective when implemented by a coordinated motion control system for moving the cold spray nozzle with a high degree of tool path movement accuracy. Examples of apparatus capable of meeting such accuracy requirements may include: (1) a multi-axis manipulator apparatus such as a 6 axis robotic arm or 5 axis gantry system, (2) a high-accuracy computer numerical control (CNC) apparatus to control such a manipulator, and (3) a computer interface apparatus with CAM software capable of executing the aspects and techniques of the method set forth in this disclosure and having a digital twin of the entire robotic motion system utilized for the cold spray additive manufacturing process. All three apparatus may be communicatively interconnected for digital communications and may rely on each of the other two apparatus for effectiveness. The combination of apparatus may permit a user to provide a part to be modified by the system, import a digital model of the part into the CAM software, generate a tool path that will result in mitigated geometric and material defects, simulate the tool-path in a digital twin to insure no collisions, and execute the optimized tool path to the necessary degree of accuracy to produce or modify the desired part.

In some greater detail, the multi-axis manipulator apparatus may include at least 5 axes of motion so that the orientation of the nozzle with respect to the workpiece may be varied freely to achieve the addition of material in virtually any orientation, similar to the way a 5 axis machining center operates when removing material. More commonly, a 6-axis robot-arm manipulator apparatus may be used due to the relatively light loads imposed on the arm by a cold spray nozzle as compared to a machine tool, as well as the prevalence of robotic arms in industrial use. The cold spray nozzle may be moved relative to the object of the cold spray particles, either by supporting the cold spray nozzle at the end of the robot-arm manipulator apparatus and moved the nozzle with respect to the object being fixed in place, or by holding the nozzle stationary and mounting the object at the end of the arm and moving the object with the arm. One benefit of holding the cold spray nozzle on the end of the robot arm is that it has a constant shape and weight which can be known throughout the build process, while a drawback of supporting the cold spray nozzle on the robot arm is that, in systems with remote heaters and hot gases being conveyed to the cold spray applicator/nozzle assembly through a hot gas line, the hose of the hot gas line can be exposed to greater wear and eventually may fail over time due to repeated violent motions. One benefit of holding the cold spray nozzle in a fixed position is that the hot gas hose will not be subject to as much motion, and the resulting wear and deterioration, over time and the hose may be made relatively shorter in length, allowing for improved insulation and heat retention from the heater to the nozzle. Some cold spray system designs include heating at the cold spray applicator nozzle so that only cold gas is conveyed to the gun nozzle, thus reducing the risk of wear and failure, but increasing the mass and size of the applicator assembly supported at the end of the robot arm. A drawback of holding the cold spray nozzle fixed is that the object that is being fabricated will change shape and weight over time, thus making the kinematic model of the robotic arm motion or difficult to compute. An additional drawback of holding the work object with the robotic arm of the manipulation system is that, as material is added to the object and the object becomes heavier, manipulation of the object becomes more difficult and may also limit the scalability of the part manufacture to larger sizes due to the limitations on arm maneuverability imposed by the increase weight of the part.

In some embodiments, the manipulator apparatus may also provide movement along additional coordinated axes, such as may be provided by a 2 or 3-axis turntable or 1-axis horizontal positioner. Additional axes may permit an expanded range of possible nozzle-to-part orientations as well as the reduction in workload on any one axis. In such configurations, the object of the additive manufacturing is typically mounted on one of the additional-axis manipulators (such as the turntable or positioner) while the cold spray nozzle is held by the 6-axis robot-arm. The additional axes may permit the object to be rotated so that the cold spray nozzle can reach areas of the object that would not be reachable by a 6-axis robot-arm alone or would impart significant strain to the hoses carrying the cold spray materials in order to reach those areas. Any additional axes must be fully-coordinated with the 6-axis robot arm such that the position of the cold spray nozzle with respect to the object may be known at all times.

The computer numerical controller apparatus may be capable of storing and administering the kinematic models of all robotic manipulator apparatus of the system as well as the weight and shape of objects mounted to each manipulator apparatus. The CNC apparatus may receive data regarding a tool path exported from the CAM software, such as may be generated by the methods of the present disclosure, as input and may generate a series of robot arm joint motions as output that will result in the cold spray nozzle being carried by the manipulator apparatus along the prescribed tool path as closely as possible. The path accuracy, defined as the deviation of the average distance of the actual path of the tool (e.g., nozzle) from the prescribed path of the tool, should be no larger than 20% of the baseline line spacing used in the cold spray recipe. As an example, for a typical cold spray recipe with a plume diameter of 5 mm and line spacing of 0.5 mm, the path accuracy should be no larger than 0.1 mm. The velocity accuracy, defined as the average absolute difference between the actual tool path velocity and the prescribed tool path velocity, should be no larger than 5% of the baseline tool path velocity. As an example, for a typical cold spray recipe with a tool path velocity of 400 mm/s, the velocity accuracy should be no greater than 20 mm/s. The condition on velocity accuracy may be essential to the cold spray additive manufacturing techniques of the disclosure because the feedstock flow rate cannot be readily changed or altered as may be the case when employing other additive manufacturing technologies. As a result, tool path velocity may be the most effective way to affect local deposit thickness.

The computer interface apparatus may include a user computer interface with installed CAM software. The CAM software may include typical CAM programming capabilities such as the ability to import digital models of parts, generate multi-axis tool paths, and export tool paths to the CNC apparatus. The CAM software may also include be programmed modules capable of executing the methods of the disclosure. A digital-twin, such as an exact digital model of the entire apparatus, may programmed into the CAM software. The digital-twin may permit the user to simulate the entire process beforehand and verify that no collisions will occur during the actual cold spray operation.

When employed for usages such as scenarios (1) and (2) identified in this disclosure, the apparatus and method of the disclosure are capable of producing deposits on substrates 6 having initial surfaces with complex contours while exhibiting control of the thickness of the layer of deposited material substantially equivalent to the mean diameter of the powder being used for the additive material of the cold spray deposition process. Total material deposit thickness may therefore be based on the number of layers applied and equivalent to the mean particle diameter (typically approximately 10 to approximately 50 microns). In these applications, the radius of curvature of the part or build mandrel 5 on which the material is applied may be equivalent to approximately 2 times the width of the plume for minimal impact on the quality of the deposited material layer for most materials that have been sprayed. Below 2 times the plume width, materials with expected high mechanical properties in the as-deposited condition, such as alloyed aluminum sprayed with helium at approximately 3.5 MPa to approximately 5 MPa pressure and approximately 400 degrees to approximately 500 degrees C. gas temperatures, would begin to show a reduction in desired mechanical properties. When considering density (or the inverse, porosity) only, however, several materials will successfully deposit dense material even at radii of curvature of 5% of the plume width. Multiphase materials, in particular, such as nickel powder blended with chromium carbide containing powder, have been shown to produce extreme high density in these very small radii.

When employed for usages such as scenarios (3) and (4) identified in this disclosure, the apparatus and method of the disclosure are capable of producing similar layer thickness and radii of curvature as for scenarios (1) and (2) but also have a spatial component. Features to be built with the cold spray material may be limited to feature widths of 1 times the width of the plume. Feature width accuracy may be improved for features having widths exceeding 2 times the plume width.

Material properties may be highly dependent on process conditions including, for example, equipment type, gas type, gas pressure, and gas temperature, as well as secondary processing techniques including, for example, induction or laser heating, furnace heating, or hot isostatic pressing. Defect concentration and alignment also play a key role in material properties of the final part. The method of the disclosure includes the provision for minimizing these defects by prediction of the buildup shape and consequently by minimizing the occurrence of unintentional high-angle impacts. In addition, by predicting the feature shape, it is also possible to minimize feature shadowing which can result in aligned defects that can lead to hazardous localized point defects.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A method of additive manufacturing using a cold spray deposition apparatus having a nozzle from which particles of a cold spray material are sprayed, the nozzle having a central axis forming an impact angle with a supporting surface on which the material is to be deposited, the method comprising:
    providing an additive material for application to the supporting surface using a cold spray deposition technique;
    analyzing characteristics of deposited cold spray material, including:
        forming a single line of deposited cold spray material on the supporting surface using the cold spray deposition technique by moving the nozzle of the cold spray deposition apparatus along the supporting surface and emanating particles of the cold spray material from the nozzle onto the supporting surface;
        measuring at least one material property of the deposited cold spray material; and
        generating a model of a geometric profile characteristic and a material defect characteristic of the single line of deposited cold spray material as a function of the impact angle of cold spray material sprayed from the cold spray deposition apparatus;
    selecting a proposed path of movement of the nozzle of the cold spray deposition apparatus with respect to the supporting surface;
    predicting, using the generated model, a bulk deposit geometry and a material defect distribution resulting from the proposed path of movement of the nozzle of the cold spray deposition apparatus;
    modifying the proposed path of movement of the nozzle of the cold spray deposition apparatus to reduce error between the predicted bulk deposit geometry and a desired contour of the exterior of the component and reduce a defect distribution present in the component;
    initiating spray deposition of the particles of the cold spray material from the nozzle of the cold spray deposition apparatus; and
    moving the nozzle of the cold spray deposition apparatus along the modified path of movement of the nozzle.

2. The method of claim 1 wherein the step of modifying the proposed path of movement includes modifying the proposed path of movement of the nozzle to reduce an overall probability of material defects based upon the model of material defect characteristic of the single-line of deposited cold spray material.

3. The method of claim 1 wherein the supporting surface onto which cold spray deposition is initiated is on a mandrel for forming a component on the mandrel by the cold spray deposition material, the mandrel being removable from the deposited material forming the component such that the cold spray deposited material forms an entirety of the component.

4. The method of claim 1 wherein the supporting surface onto which cold spray deposition is initiated is on a substrate of an at least partially formed component in a manner such that the material becomes part of the component.

5. The method of claim 4 wherein the addition of cold spray deposited material provides a restorative repair of the component to restore an original contour of an exterior of the component such that the cold spray deposited material forms only a portion of the component.

6. The method of claim 4 wherein the addition of cold spray deposited material provides an extension of an original contour of an exterior of the component such that the cold spray deposited material forms only a portion of the component.

7. The method of claim 1 wherein the step of forming a single line of deposited cold spray material on the supporting surface comprises executing a single pass of the spray apparatus over the supporting surface with the supporting surface being planar and the impact angle being perpendicular to the planar supporting surface.

8. The method of claim 1 wherein the geometric profile characteristic relates to a profile shape of a cross-section of the single line of deposited cold spray material taken in a plane oriented perpendicular to the path of movement of the nozzle in forming the single line of deposited cold spray material.

9. The method of claim 8 wherein the geometric profile characteristic includes at least one geometric relationship.

10. The method of claim 9 wherein the at least one geometric relationship includes a first geometric relationship relating a value of the height of the profile shape of the deposited material of the single line to a position of a plume of cold spray material particles emanating from the nozzle of the spray apparatus.

11. The method of claim 10 wherein the at least one geometric relationship includes a second geometric relationship relating a value of the height of the profile shape of the deposited material of the single line to a value of the impact angle of the particles of the plume.

12. The method of claim 1 wherein the material defect characteristic relates to an occurrence of defects in the cold spray deposited material of the single line.

13. The method of claim 12 wherein the material defect characteristic includes at least one defect relationship.

14. The method of claim 13 wherein the at least one defect relationship includes a first defect relationship relating a frequency of occurrence of defects in the cold spray deposited material the single line to a value of the impact angle of the particles of a plume of cold spray material particles emanating from the nozzle of the spray apparatus.

15. The method of claim 1 wherein selecting the proposed path of movement includes a series of position values for the nozzle to move the nozzle along the proposed path of movement and a corresponding series of orientation values for the nozzle of the spray apparatus to orient the nozzle of the spray apparatus with respect to the supporting surface along the proposed path of movement.

16. The method of claim 15 wherein selecting the proposed path of movement includes determining a series of tool movements to achieve a tool path utilized to position and orient the nozzle along the proposed path of movement.

17. The method of claim 1 wherein the method of claim 1 wherein the step of generating the model includes establishing a relationship between the at least one material property measured and the material defect characteristic of the single line of deposited cold spray material.

18. The method of claim 1 wherein the at least one material property of the deposited cold spray material comprises porosity of the deposited cold spray material.

19. The method of claim 1 wherein the at least one material property of the deposited cold spray material comprises micro-hardness of the deposited cold spray material.

* * * * *